United States Patent [19]

Tada et al.

[11] Patent Number: 4,832,430
[45] Date of Patent: May 23, 1989

[54] OPTICAL SWITCH

[75] Inventors: Kunio Tada, Urawa; Yoshitaka Okada, Uji; Hiroaki Inoue, Hachiouji; Hiroyoshi Matsumura, Saitama, all of Japan

[73] Assignee: Hitachi, Ltd., Tokyo, Japan

[21] Appl. No.: 8,371

[22] Filed: Jan. 29, 1987

[30] Foreign Application Priority Data

Jan. 29, 1986 [JP] Japan .................... 61-15632

[51] Int. Cl.⁴ ................................. G02B 6/10
[52] U.S. Cl. ................................. 350/96.14
[58] Field of Search ............ 350/96.11, 96.13, 96.14; 357/30 E, 30 L

[56] References Cited

U.S. PATENT DOCUMENTS

| 3,902,133 | 8/1975 | Watts ........................... 350/96.11 X |
| 4,675,518 | 6/1987 | Oimura et al. ............... 350/96.11 X |
| 4,693,543 | 9/1987 | Matsumura et al. ......... 350/96.11 |
| 4,730,330 | 3/1988 | Plihal et al. .................. 357/19 |

Primary Examiner—Gene Wan
Attorney, Agent, or Firm—Antonelli, Terry & Wands

[57] ABSTRACT

Electrodes are provided in the vicinity of the switching region of a carrier injection type optical switch, and carriers are removed rapidly through these electrodes when the switch is turned OFF. As the result, a switching speed is increased.

15 Claims, 4 Drawing Sheets

OPTICAL SWITCH

BACKGROUND OF THE INVENTION

The present invention relates to an optical switch using carrier injection so as to utilize refractive index change and/or absorption coefficient change caused thereby, and particularly it relates to an optical switch conducting high-speed operations, having an element small in size and being suitable for an optical integrated circuit.

Among the prior-art optical switches using carrier injection, there is a total internal reflection type (TIR) optical switch as an optical stitch which alters its output ports by utilizing the refractive index change, on which descriptions are made in the Collected Papers S7-4 for the 1985 National Meeting of Semiconductor-Material Department of Institute of Electronic Communication Engineer of Japan, INOUE et al., and in Pending U.S. patent application Ser. No. 684,784 (MATSUMURA et al.). Moreover, there is a loss modulation type optical switch as an optical switch which acts as an intensity modulator and/or an ON/OFF switch by utilizing the absorption coefficient change, among the prior-art switches, on which a description is made in the Collected Papers 926 for the 1985 Combined National Meeting of Institute of Electronic Communication Engineers of Japan, YAMAGUCHI et al. These optical switches utilize a large refractive index change and/or absorption coefficient change caused by the injection of carriers, and they are characterized by being small in size and having a high extinction ratio. In these optical switches, however, the carriers injected in a switching region implementing alteration of output ports and/or action as an intensity modulator and/or an ON-OFF switch become extinct in accordance with the life time of their recombination when the optical switches are desired to turn OFF, in other words, when the injection of the carriers is stopped. Consequently, the response speed of the switches is limited to be about several nsec to several tens nsec.

SUMMARY OF THE INVENTION

The above-described prior arts have the problems that no consideration is given to making the response speed (switching speed) of the optical switch high and that it is difficult to make the switching speed higher than that of nsec.

An object of the present invention is to improve remarkably the switching speed of the carrier injection type optical switch having an element small in size and a high extinction ratio and being suitable for an optical integrated circuit.

The above object is attained by providing electrodes in the switching region of the carrier injection type optical switch or in the vicinity of this region so that carriers be removed rapidly through these electrodes when the switch is turned OFF.

BRIEF DESCRIPTION OF THE DRAWINGS

FIGS. 1A and 1B are illustrations of a first embodiment of the present invention, while FIGS. 1A and 2A are top views of an optical switch, while FIGS. 1B and 2B are sectional views taken along lines B—B' in FIGS. 1A and 2A respectively.

FIG. 6A is a top view thereof, while FIG. 6B is a sectional view taken along a line B—B' in FIG. 6A. FIG. 7A is a top view thereof, while FIG. 7B is a sectional view taken along a line B—B' in FIG. 7A.

DETAILED DESCRIPTION OF THE INVENTION

Figure 1A:
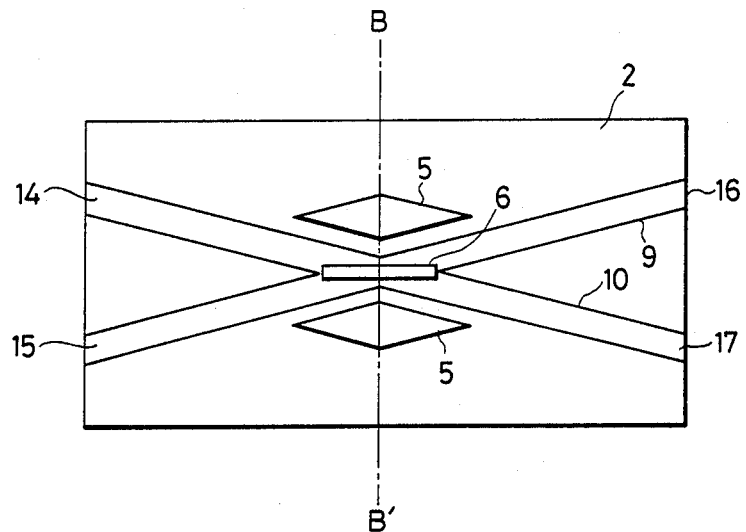
Figure 1B:
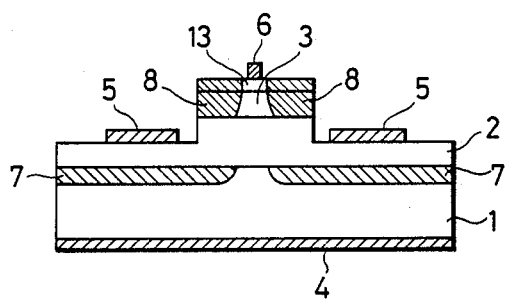

The principle of the optical switch of the present invention will be described with a total internal reflection type optical switch illustrated in FIGS. 1A and 1B as a first embodiment, taken as an example. FIG. 1A is a plan view of the total internal reflection type optical switch, while FIG. 1B is a sectional view taken along a line B—B' of the intersection region (switching region) thereof. As illustrated in the figures, electrodes 4, 5 and 6 are provided in close contact with or in the vicinity of semiconductor regions 1, 2 and 3 respectively and a circuit is so set that a potential difference occurs between the electrodes 4 and 5 and/or between the electrodes 5 and 6 in a period after the injection of carriers is stopped. Thereby the carriers can be extracted at a very high speed from the semiconductor region 22 through which light waves are guided. In other words, the carriers can be extracted in accordance with a transit time $\tau_t$ determined by the diffusion of the carriers represented by the following equation, in which a distance of transfer of the carriers through the semiconductor region 2 is denoted by W and a diffusion coefficient by D.

$$\tau_t = (W^2/2D)$$

It is known that the diffusion coefficient is about 80 to 130 cm$^2$/sec when electrons are used as the carriers and such a material as GaAs, GaAlAs, InP, InGaAs or InGaAsP is used for the semiconductor region 2, for instance. When W=1 μm, accordingly, $\tau_t$=39 to 63 psec, which means that the carriers can be extracted at a very high speed. The amount of change of carriers in the region 2 is represented immediately, on the occasion as the amount of refractive index change and/or that of absorption coefficient change in the aforesaid switching region. Therefore the light reflectivity of the total internal reflection type optical switch shown in FIG. 1 change sharply, and thus a high-speed switching operation can be obtained. A time $\tau$ required for this switching operation is expressed generally by a value about 2.3 times larger than the value of $\tau_t$, and thus a high-speed operation of about 90 to 145 psec is enabled. As stated above, the change in the amount of carriers in the region 2 results in the change in the refractive index and/or the absorption coefficient. It is clear, therefore, that the principle of the invention of the present application can be applied also to all the optical switches that are operated by the injection of carriers, such as those of a directional coupler type, an interferometer type such as the Mach-Zehnder interferometer, a cavity type, a loss modulation type, a cut-off type, and a variety of others, in addition to the total internal reflection type optical switch of FIGS. 1A and 1B which is operated by the injection of carriers.

The injected carriers change the refractive index or absorption coefficient in the semiconductor region 2, to alter the output ports of the optical switch or to modulate the intensity of light. By extracting the carriers from the semiconductor region 2, a reverse alteration of the output ports of the optical switch or a reverse modulation of the intensity of light is accomplished.

DETAILED DESCRIPTION OF PREFERRED EMBODIMENTS

Embodiments of the present invention will be described hereunder with reference to the drawings.

Embodiment 1

A description will be made on this embodiment with reference to FIGS. 1A and 1B. FIG. 1A is a plan view of a total internal reflection type optical switch, and FIG. 1B a sectional view taken along a line B—B' in FIG. 1A.

First, a Zn diffusion region 7 was formed in part of the surface layer of an n-type InP substrate 1 having a carrier density of $2\times10^{18}$ cm$^{-3}$, and subsequently a p-InGaAsP layer (optical waveguide layer) 2, an n-InP layer (cladding layer) 3 and an InGaAsP layer (cap layer) 13 were formed sequentially by using a liquid-phase epitaxy method.

Next, Zn was diffused in part of the InP layer 3 and the cap layer 13 to form a current blocking region 8.

Then, part of the layers 13, 3 and 2 was removed by using a phosphoric acid etchant, so as to form protuberant ridge waveguides 9 and 10, as illustrated in FIGS. 1A and 1B.

Lastly, an electrode 5 was formed of Au-Zn and electrodes 4 and 6 of Au-Ge-Ni respectively by using evaporation, and thereby a 2×2 terminal optical switch was completed.

Figure 4:
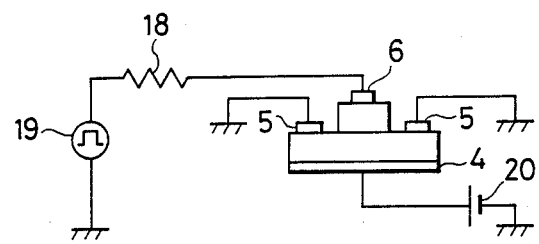
FIG. 4 is a connection circuit diagram for evaluation of characteristics of the optical switch in the embodiment.

The optical switching characteristic of the optical switch thus formed was examined by making a beam of light of wavelength 1.55 μm fall on the light incident end 14 of the optical switch and by measuring the intensity of the light emitted from the light emitting ends 16 and 17 thereof. On the occasion, an electric connection was arranged as shown in FIG. 4. When an electric signal of pulse width 2 nsec, pulse rise 0.1 nsec an pulse amplitude 5 Vp-p was impressed by using an oscillator 19, beams of light emitted from the light emitting ends 16 and 17 were reverse in polarity to each other and had the same waveform with that of said electric signal. A delay in response was 0.5 nsec or below in terms of a delay in rise time and fall time.

Embodiment 2

Figure 2A:
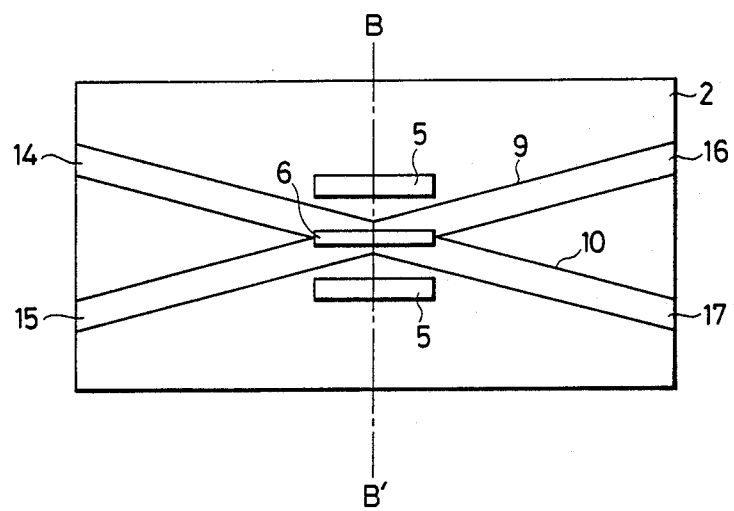
FIGS. 2A and 2B are illustrations of a second embodiment of tee present invention.
Figure 2B:
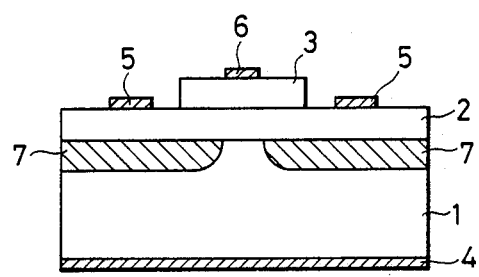

An optical switch using a strip loaded waveguide which had a structure shown in FIGS. 2A and 2B and being similar to that of the above-described embodiment, was manufactured according to the above-described method. Consequently, the same results as in the above embodiment were obtained. FIG. 2A is a plan view of this second embodiment, and FIG. 2B a sectional view taken along a line B—B' in FIG. 2A.

Embodiment 3

A 1×2 terminal optical switch having a Y-branch structure similar to that of the above embodiment was manufactured according to the above-described method. The same results as in the above embodiment were obtained therefrom.

Embodiment 4

Figure 6A:
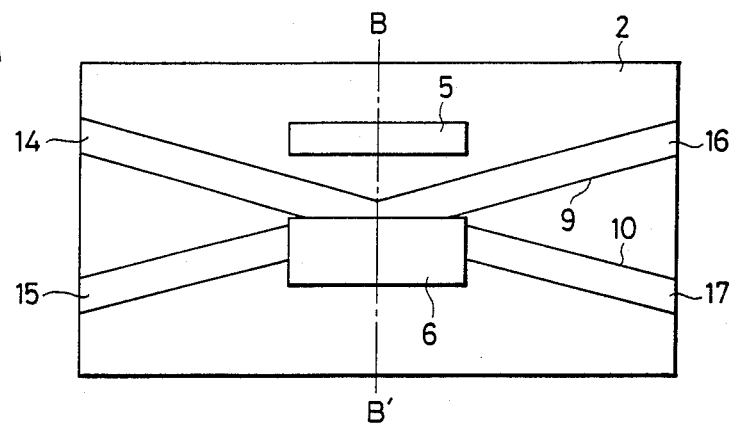
FIGS. 6A and 6B are illustrations of a fourth embodiment of the present invention.
Figure 6B:
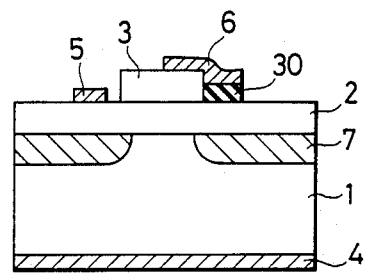

The same results were obtained by arranging an electrode structure as shown in FIGS. 6A and 6B. FIG. 6A is a plan view of this fourth embodiment, and FIG. 6B a sectional view taken along a line B—B' of FIG. 6A. In the manufacture of this embodiment, an insulating layer 30 was inserted so that an electrode 6 is in contact only with a semiconductor region 3 being invisible behind it and not shown in the figure and in no contact with a semiconductor region 2.

Embodiment 5

Figure 3:
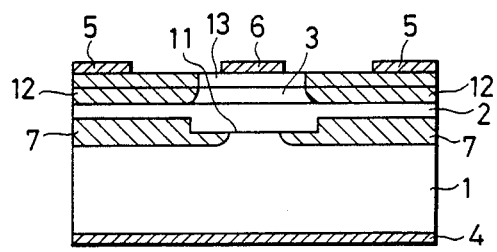
FIG. 3 is a sectional view of an optical switch of a fifth embodiment of the present invention.

This embodiment will be described by using FIG. 3. FIG. 3 is a sectional view of this embodiment First a channel 11 was formed on the surface of an n-type InP substrate 1 having a carrier density 1 of $2\times10^{18}$ cm$^{-3}$ by a conventional etching method so as to form optical waveguides corresponding to the optical waveguides 9 and 10 in the embodiment 1. Next, Zn was diffused in part of the surface of the substrate to form a current confining layer 7.

Subsequently, a p-InGaAsP layer 2 in which a wavelength corresponding to the band gp energy was 1.5 μm, an n-InP layer 3, and a cap layer 13 of InGaAsP, were formed sequentially by liquid-phase epitaxy. Then, Zn was diffused in part of the n-InP layer 3 and the cap layer 13 to form a current channel 12 (a current confining layer in relation to an injected current). Lastly Cr-Au was evaporated to provide electrodes 5 and 6, and Au-Ge-Ni was evaporated to provide an electrode 4, thus completing an optical switch The optical switch thus formed showed the same operation characteristics as in the case of the embodiment 1.

The optical waveguide in the present embodiment is called a channel stripe waveguide.

In the present embodiment as well, quite the same results were obtained either by using the same Y-branch structure as in the foregoing embodiment 3 or by arranging an electrode structure in the same way as shown in FIGS. 6A and 6B.

Embodiment 6

Figure 5:
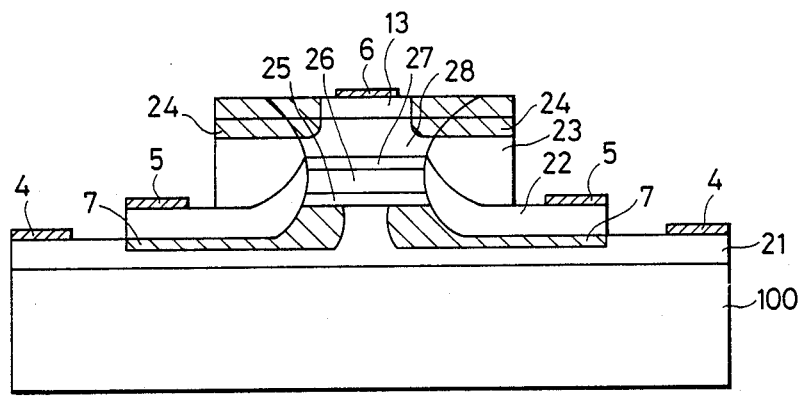
FIG. 5 is a sectional view of an optical switch of a sixth embodiment of the present invention.

This embodiment will be described by using FIG. 5. The present embodiment is one example of an optical switch in which an optical waveguide having a BH (Buried Hetero-junction) structure is formed on an insulative substrate.

An n+-InP layer 21 was made to grow on an insulative InP substrate 100 by using liquid-phase epitaxy, Zn was diffused in part of this layer, and thereby a current confining layer 7 was formed.

Next, a p-InGaAsP layer (buffer layer) 25, a p-InGaAsP waveguide layer 26, an n-InGaAPP layer (buffer layer) 27, an n-InP layer (cladding layer) 28 and an n-InGaAsP layer (cap layer) 13 were made to grow in a crystallizing manner sequentially by liquid-phase epitaxy. Subsequently mesa etching was applied to form the layers 7, 25, 26, 27 and 28 in mesa structures respectively by using a Br-methanol etchant, and then a p-InGaAsP layer 22 and an n-InP layer 23 were made to grow so that they buried said mesa structures. Subsequently, Zn was diffused to form a current confining layer 24, selective etching was applied, moreover, to expose the portions in which electrodes were to be formed, electrodes 4, 5 and 6 were formed therein by evaporation, and thus an optical switch was completed.

While operating like that of the embodiment 1, this optical switch is easier to apply to integration, because all the electrodes of the optical switch of the present embodiment are formed only on one surface of the substrate.

In the present embodiment as well, quite the same results were obtained either by using the same Y-branch structure as in the above-described embodiment 3 or by arranging an electrode structure in the same way as shown in FIGS. 6A and 6B.

As can be seen easily from that the refractive index change in the region having carriers injected is utilized as the principle of the optical switch, in the above-described embodiments 1, 2, 3, 4, 5 and 6, the present invention is applicable to any optical switch construction of the directional coupler type, interferometer type, cavity type and the like in which the refractive index change is utilized, other than the one of the total internal reflection type.

Embodiment 7

Figure 7A:
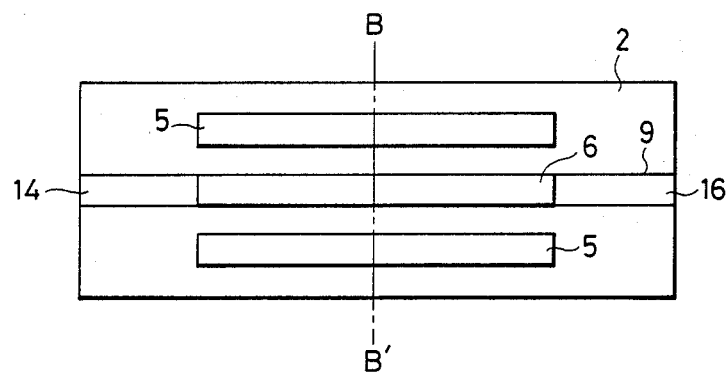
FIGS. 7A and 7B are illustrations of a seventh embodiment of the present invention.
Figure 7B:
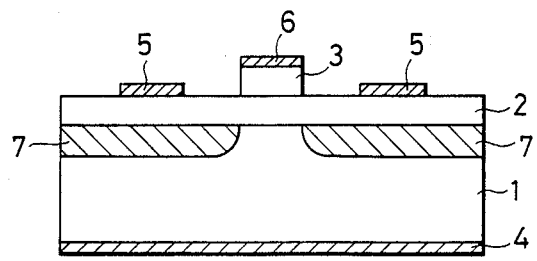

This embodiment will be described by using FIGS. 7A and 7B. FIG. 7A is a plan view of this embodiment, and FIG. 7B a sectional view taken along a line B—B' in FIG. 7A.

Manufacture was made by quite the same method as in the case of the embodiment 1. The optical switch of the present embodiment is different from that of the embodiment 1 in that it has only one waveguide 9 and that the width of an electrode 6, i.e., the length thereof in the B—B' direction, is about as large as the width of the waveguide 9.

When a light was applied to the light incidence end 14 of this optical switch and the intensity of the light emitted from the light emitting end 16 thereof was measured in the same way as in the embodiment 1, an optical signal was modulated in accordance with the waveform of a signal impressed on the electrode 6, while the response speed characteristic thereof was the same with those in the embodiment 1, 2 and 6.

In the aforesaid embodiment 7 in which the strip loaded waveguide was employed, the same result was obtained also when a waveguide of a ridge type, a channel stripe type or a BH type having the same waveguide structure as in the embodiments 1, 2, 5 and 6 was employed.

In the above-described embodiments 1, 2, 3, 4, 5, 6 and 7, the same result was obtained also when the conductivity type of each semiconductor was reversed.

Moreover, the same result was obtained also when a semiconductor of GaAs-GaAlAs or Si was employed, and furthermore, the present invention could be adapted also when the junction between semiconductors was homogeneous.

While the current confining layers 7, 8, 12 and 24 were provided respectively in the embodiments described herein, the same result was obtained also in a construction in which part or the whole of the layer of this kind was removed. Although the efficiency of switching tends to be deteriorated a little due to the diffusion of a current on occasion, there is an advantage that manufacture is facilitated.

The present invention enables the attainment of the optical switch which is small in size and has the performance of high extinction ratio and a remarkably high response speed, thus facilitating the construction of a large capacity optical transmission-communication system and an optical exchange system and, accordingly, producing a very large industrial effect.

What is claimed is:

1. An optical switch comprising:
   a semiconductor substrate region;
   a semiconductor waveguide region having a conductivity type opposite to that of the substrate region and being disposed adjacent to said substrate region;
   a semiconductor cladding region having the same conductivity type as that of the substrate region and being disposed separate from the substrate region, but adjacent to the waveguide region; and
   a plurality of electrodes for supplying an electric field to the substrate region, waveguide region and cladding region, respectively and including at least one electrode through which carriers in the waveguide region are extracted.

2. An optical switch according to claim 1, wherein a change in refractive index caused by carriers injected from at least one of said substrate region and said cladding region into said waveguide region is utilized for altering output ports of the optical switch, the carriers injected in said waveguide region are extracted from said waveguide regions by controlling a voltage impressed on at least one of said substrate region and said cladding region, and an alteration of the output ports of the optical switch in a reverse direction to the first-stated alteration of the output ports of the optical switch is performed by the extraction of the injected carriers.

3. An optical switch according to claim 1, wherein said substrate region, said waveguide region and said cladding region are formed of compound semiconductors.

4. An optical switch according to claim 1, wherein a current confining region is provided at least in one of said substrate region and said cladding region.

5. An optical switch according to claim 1, wherein said optical switch is a total internal reflection type optical switch.

6. A optical switch according to claim 1, wherein said optical switch uses a strip loaded waveguide.

7. An optical switch according to claim 1, wherein said optical switch includes a Y-branch structure.

8. An optical switch according to claim 1, wherein said optical switch includes a channel stripe waveguide.

9. An optical switch according to claim 1, wherein said optical switch includes a buried hetero-junction structure.

10. An optical switch according to claim 1, wherein said optical switch includes a single waveguide.

11. An optical switch according to claim 1, wherein a change in absorption coefficient caused by carriers, injected from at least one of said substrate region and said cladding region into said waveguide region is utilized for modulating the intensity of light, the carriers injected in said waveguide region are extracted from said waveguide region by controlling a voltage impressed on at least one of said substrate region and said cladding region, and a modulation of the intensity of light in a reverse direction to the first-stated modulation of the intensity of light is performed by the extraction of the injected carriers.

12. An optical switch comprising:
    a semiconductor substrate region;
    a plurality of semiconductor layers formed adjacent said substrate region including a semiconductor waveguide region and a semiconductor cladding region;

first means for injecting carriers into said waveguide region; and second means for extracting the injected carriers from said waveguide region.

13. An optical switch according to claim 12, wherein the first means and the second means include a common electrode.

14. An optical switch according to claim 12, wherein said first means inject carriers into said waveguide region to alter the output ports of the optical switch in a first direction; and said second means extract the injected carriers from said waveguide region to alter the output ports of the optical switch in a reverse direction to said first direction.

15. An optical switch according to claim 12, wherein said first means inject carriers into said waveguide region to modulate the intensity of light in a first direction; and said second means extract the injected carriers from said waveguide region to modulate the intensity of light in a reverse direction to said first direction.

* * * * *